Sept. 28, 1965 J. W. COLVIN 3,208,544
STEPPING WHEEL VEHICLE
Filed May 17, 1963 9 Sheets-Sheet 3 fig. 3 fig. 11

INVENTOR.
JAMES W. COLVIN
BY Harry M. Saragovitz,
Edward J. Kelly,
Herbert Berl &
James W. Colvin Sept. 28, 1965

J. W. COLVIN 3,208,544

STEPPING WHEEL VEHICLE

Filed May 17, 1963

INVENTOR.
JAMES W. COLVIN
BY Harry M. Saragovitz,
Edward J. Kelly,
Herbert Berl &
James W. Colvin Sept. 28, 1965   J. W. COLVIN   3,208,544
STEPPING WHEEL VEHICLE Filed May 17, 1963   9 Sheets-Sheet 6

INVENTOR.
JAMES W. COLVIN
BY Harry M. Saragovitz,
Edward J. Kelly,
Herbert Berl &
James W. Colvin Sept. 28, 1965    J. W. COLVIN    3,208,544
STEPPING WHEEL VEHICLE
Filed May 17, 1963    9 Sheets-Sheet 7 fig 8 fig 7

INVENTOR.
JAMES W. COLVIN
BY Harry M. Saragovitz,
Edward J. Kelly,
Herbert Berl &
James W. Colvin Sept. 28, 1965  J. W. COLVIN  3,208,544

STEPPING WHEEL VEHICLE

Filed May 17, 1963  9 Sheets-Sheet 8 fig. 10 fig. 9

INVENTOR.
JAMES W. COLVIN
BY Harry M. Saragovitz,
Edward J. Kelly,
Herbert Berl &
James W. Colvin Sept. 28, 1965  J. W. COLVIN  3,208,544
STEPPING WHEEL VEHICLE Filed May 17, 1963  9 Sheets-Sheet 9

INVENTOR.
JAMES W. COLVIN
BY Harry M. Saragovitz,
Edward J. Kelly,
Herbert Berl &
James W. Colvin United States Patent Office 3,208,544
Patented Sept. 28, 1965

3,208,544
STEPPING WHEEL VEHICLE
James W. Colvin, Williamsburg, Va., assignor to the United States of America as represented by the Secretary of the Army
Filed May 17, 1963, Ser. No. 281,371
8 Claims. (Cl. 180—8)
(Granted under Title 35, U.S. Code (1952), sec. 266)

This invention relates to steerable automotive vehicles and particularly to a very large vehicle for military use in off-road operations, such as crossing areas of deep snow, ridged ice, desert terrain, and other rough terrain having an uneven topography, including streams too deep to be forded by ordinary vehicles and which terrain may also be encumbered with stands of small trees or other overridable obstructions. The vehicle could also be moved through suburban area of ordinary dwelling houses and could be used for over-the-beach transportation of supplies or personnel in some cases. It is also movable along roads or highways where such facilities are available and can be shipped from place to place on railway cars or ships in a disassembled or knock-down condition.

While vehicles typical of the present invention can be manufactured in various sizes to meet different conditions, it is contemplated that a typical vehicle of the character indicated would have wheels of a large diameter, approximtaely 30 feet, for example, a body length of approximately 75 feet, a total width of approximately 35 feet, and a maximum height of approximately 30 feet.

The vehicle, as illustrated, has four large or compound wheels, each comprising a central hub and a plurality of simple wheels arranged around the central hub in planetary fashion. In the vehicle of the dimensions indicated above, each of the simple or planetary wheels would carry a pneumatic tire having a major diameter of approximately ten feet with a thickness diameter of approximately three feet. Such a tire is at present in production and has been found to be feasible and serviceable in use.

The vehicle has three different modes of locomotion. In one mode, the compound wheels are all held against rotation and only the two planetary wheels of each compound wheel which are in engagement with the supporting surface, i.e., the ground, the roadway, ice, etc., are driven. This is a non-stepping mode of operation and is for use on reasonably smooth terrain or highways. The second mode is to rotate all of the compound wheels with the planetary wheels locked against rotation. This is the basic mode of stepping operation and will enable the vehicle to overcome pressure ridges in arctic ice, desert headwalls, stream banks, deep snow and sand, forests of small trees and even buildings which are collapsible and do not materially exceed 15 feet in height. A third mode of operation is to turn all of the wheels, both compound and planetary, at the same time. This provides a combined stepping and rolling operation which can be used to increase the maximum speed of the vehicle and will also enable the vehicle to surmount somewhat higher obstacles than it can overcome in the second mode of operation. Steering is provided by forming the vehicle body in separate fore and aft parts and skewing the two parts relative to each other by power operated means.

In view of the above general description, a principal object of the invention is to provide an automotive vehicle that is so large and has wheels of such large diameter that the vehicle is able to transverse extremely rough terrain with obstacles having a height or depth up to 12 to 15 feet and that is also able to transverse areas of deep sand, snow, mud, or water.

A further object resides in the provision of giant vehicle that will carry extremely large loads, loads of the size of or larger than the loads normally carried by freight cars being contemplated.

A still further object resides in the provision of a vehicle having wheels of a diameter much greater than the diameter of the pneumatic tires with which the wheels are equipped.

Yet another object resides in the provision of an off-road vehicle having different modes of operation for different operating conditions.

Other objects and advantages will become apparent from a consideration of the following description and the appended claims in conjunction with the accompanying drawings wherein;

Figure 1:
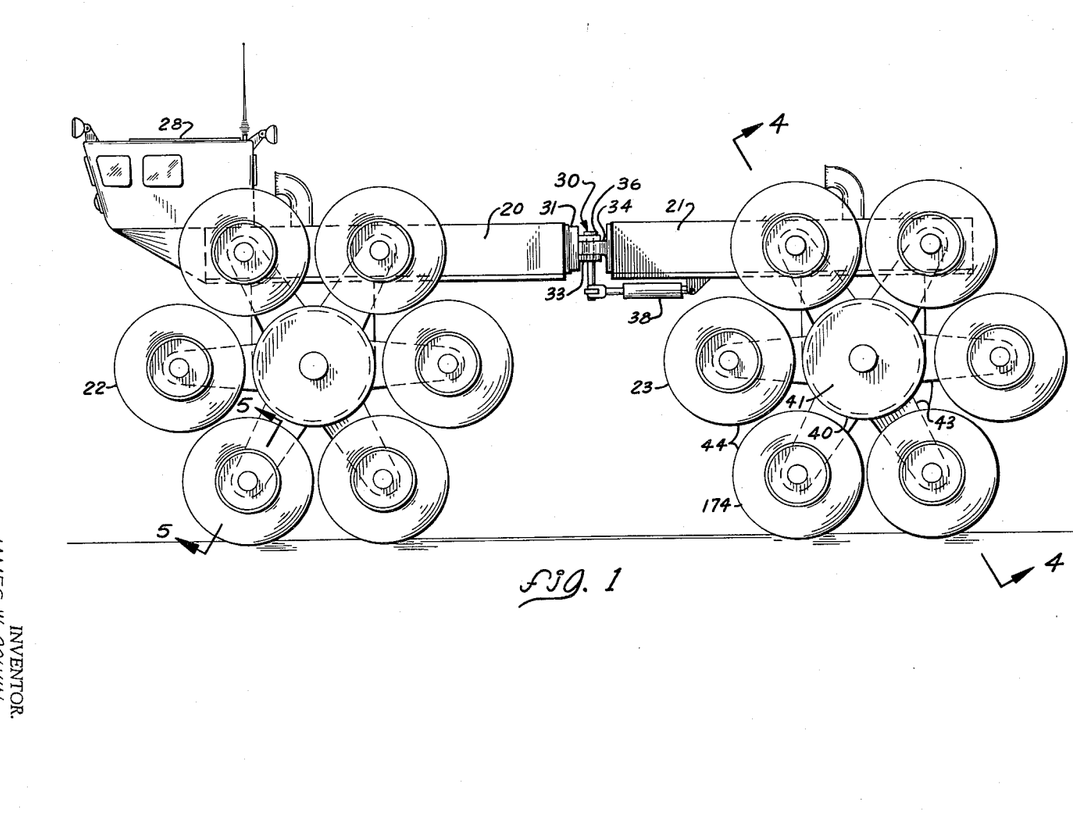
FIG. 1 is a side elevational view of an automotive vehicle illustrative of the invention.
Figure 2:
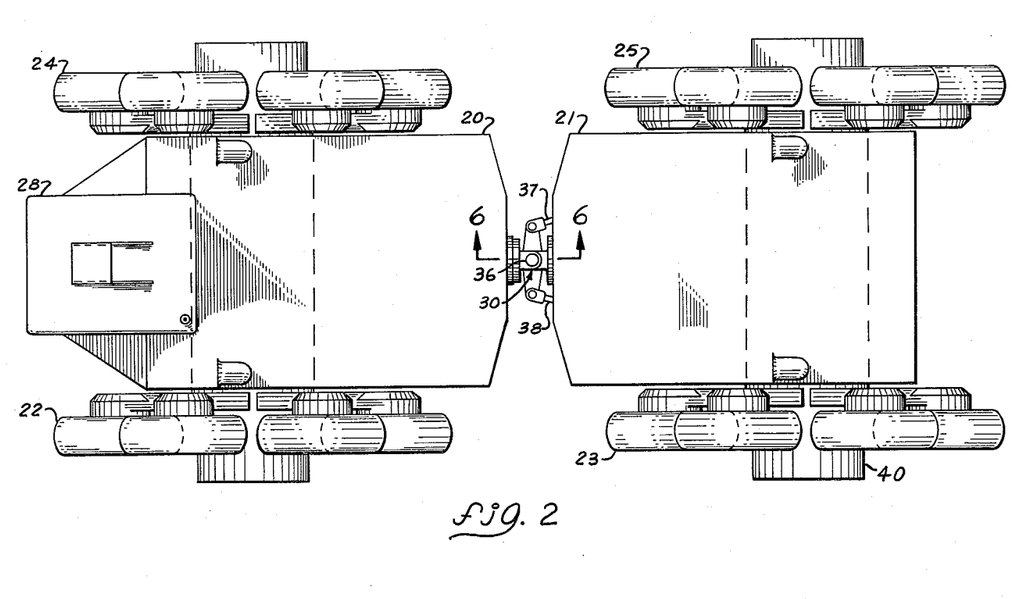
FIG. 2 is a top plan view of the vehicle illustrated in FIG. 1.
Figure 3:
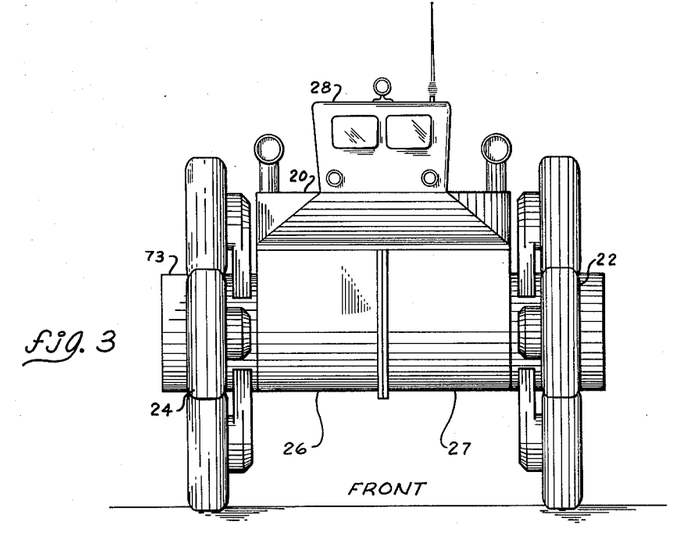
FIG. 3 is a front elevational view of the vehicle shown in FIGS. 1 and 2.

With continued reference to the drawings, and particularly to FIGS. 1, 2 and 3, the vehicle illustrated has a body comprising a forward portion 20 and a rear portion 21, four compound wheels, as generally indicated at 22, 23, 24, and 25 and four engine compartments, one associated with each of the four compound wheels with the two forward engine compartments shown in FIG. 3 and indicated at 26 and 27.

The two body portions 20 and 21 are generally rectangular in shape except that the corners of the juxtaposed ends are rounded off to facilitate the skewing of the two portions relative to each other. These body portions are preferably constructed in sections secured together transversely of each portion with each section of a size that can be conveniently carried on a conventional railway car. The sections may be formed of heavy plate steel welded or riveted together and adjacent sections may be interconnected by means of bolts extending through outwardly projecting flanges on the corresponding ends of the sections. These sections may carry, interiorly thereof, fuel and water tanks, compartments for storing supplies and spare parts and at least one of them may be arranged to carry one or more spare wheel and tire assemblies for the vehicle. The sections should be water-tight and the body portions of a sufficient volume to float the vehicle in deep water.

A cab 28 is provided on the forward end of the forward body section 20 and this cab will contain all of the driver operated control mechanism for controlling the speed of the vehicle, selecting the mode of operation, and steering the vehicle.

Figure 6:
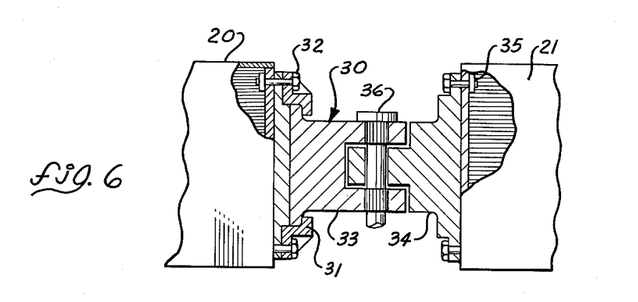
FIG. 6 is a fragmentary cross-sectional view on an enlarged scale substantially on a plane indicated by the line 6—6 on FIG. 2.

The two body portions 20 and 21 are connected together by a connection 30 wich acts somewhat in the nature of an universal joint. As shown in FIG. 6, this connection comprises a marginally flanged, circular plate 31 secured to the rear wall of the forward compartment 20 by suitable means, such as the bolts 32 and provided with an internal, annular groove in the flange thereof, a front coupling member 33 having on one end an annular flange received in the groove in the plate 31 and a rear coupling member 34 secured to the front wall of the rear body portion 21 by suitable means, such as the bolts 35. In the arrangement illustrated, the front coupling member 33 is formed to provide a rearwardly opening yoke formation with upper and lower apertured tongues and the rear cou­ling member 34 is formed to provide a forwardly extending tongue received by the tongues of the yoke formation of the member 33. The tongue of the member 34 is provided with an aperture registered with the apertures in the tongues of the member 33 and a vertically disposed coupling pin 36 extends through these registering apertures to pivotally connect the two body portions together.

With the above arrangement, the two body portions can roll relative to each other by reason of that portion of the coupling including the flange on the forward end of the coupling member 33 received in the annular groove in the flanged plate 31 and the two body portions can yaw relative to each other by reason of the coupling provided by the pin 36 but the two body portions are restrained against pitching movements relative to each other so that the body cannot sag or buckle at the location at which the two portions are coupled together.

As shown in FIG. 2, steering of the vehicle is obtained by two hydraulic piston and cylindrical devices 37 and 38 extending between the two body portions at respectively opposite sides of the coupling 30. Each of these devices is secured at one end to the rear body portion 21 and is secured at its opposite end to an arm extending laterally from the bottom end of pin 36 which is torsionally connected to the front coupling member 33. Suitable means under manual control are provided for supplying hydraulic fluid selectively to the hydraulic devices 37 and 38 so that one of the devices can be extended and the other device simultaneously contracted to turn the two body portions relative to each other about the axis of pin 36 for steering the vehicle.

Since the compound wheels 22, 23, 24, and 25 are all of the same construction, a detailed illustration and description of only one such wheel is considered adequate for the purposes of the present disclosure and the wheel 23 has been selected for this detailed description. This wheel comprises a central hub member 40 of hollow cylindrical construction having a detachable closure plate 41, at its outer end, a plurality of hollow spider arms 43 radiating outwardly from the central hub 40 at equal angular intervals around the hub and simple or planetary wheels 44 rotatably mounted one on the outer end of each spider arm 43.

The central hub is of a size that can be easily transported on a railway car and the spider arms 43 are detachable from the central hub when the wheel is to be reduced to knock-down condition for transportation. Each of the planetary wheels 44 is removable from the corresponding spider arm and is also of a size that can be transported on a railway car, the maximum tire diameter of the wheels, as contemplated, being not in excess of 10 feet. In the arrangement illustrated, there are six planetary wheels 44 arranged around the central hub 40, but this number can be increased or decreased with corresponding changes in the overall diameters of the planetary wheels as may be found necessary or desirable for different operating conditions.

Figure 4:
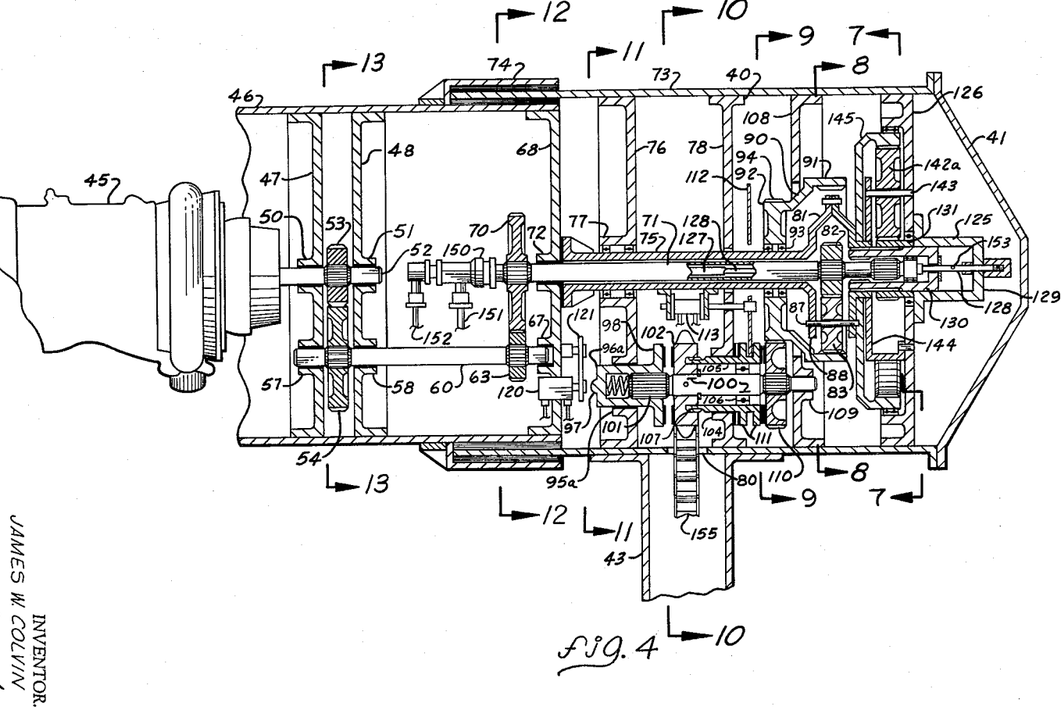
FIG. 4 is a longitudinal cross-sectional view on an enlarged scale substantially on a plane indicated by the line 4—4 on FIG. 1.

Referring now to FIG. 4, FIG. 5 and FIGS. 7 to 15 inclusive, each compound wheel is provided with an individual wheel driving engine, as indicated at 45, mounted in the corresponding body carried engine compartment, the engine compartment in FIG. 4 being of at least partly cylindrical shape and indicated at 46. A turbine-type engine of conventional design is fragmentarily illustrated but it is to be understood that other types of engines, such as piston-type diesel engines, can be used if desired, or electric motors may be substituted for the engines and derive their power from a central power generating unit which could be driven by a turbine or diesel engine or by an atomic power plant.

Figure 12:
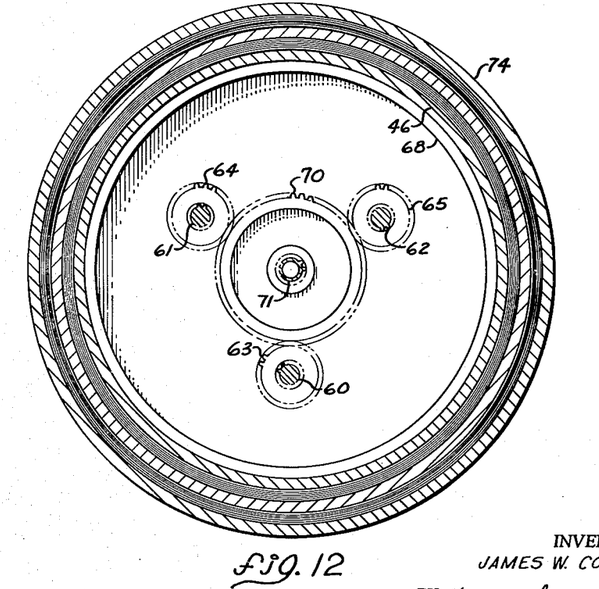
FIG. 12 is a transverse cross-sectional view substantially on a plane indicated by the line 12—12 on FIG. 4.
Figure 13:
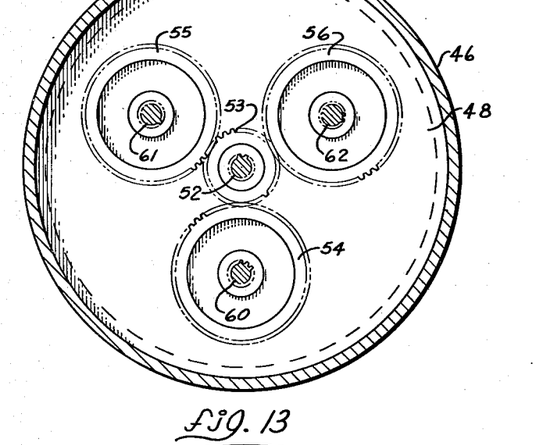
FIG. 13 is a transverse cross-sectional view substantially on a plane indicated by the line 13—13 on FIG. 4.

Adjacent the outer end of engine 45, the compartment 46 is provided with a pair of spaced apart, transverse partition walls 47 and 48 provided respectively with bearing formations 50 and 51 in which the engine drive shaft 52 is journalled. A spur gear 53 is secured on the shaft 52 by a spline connection between the partition walls 47 and 48. This gear meshes with spur gears 54, 55, and 56, FIG. 13, arranged around the gear 53 at substantially equal angular intervals and also disposed between the partition walls 47 and 48. The partition walls are also provided with bearing formations, as indicated at 57 and 58 in FIG. 4, for shafts 60, 61, and 62 which extend through the gears 54, 55, and 56, respectively, and are rotationally locked to the corresponding gears by suitable spline formations. These shafts extend outwardly from the partition wall 48 in a direction away from the engine 45 and carry gears 63, 64, and 65, respectively, as shown in FIG. 12. At their outer ends, the shafts 60, 61, and 62 are journalled in corresponding bearing formation, as indicated at 67 in FIG. 4, formed on a transverse partition wall 68 at the outer end of the engine housing 46.

The gears 63, 64, and 65 mesh with a central spur gear 70 mounted on a hollow, main drive shaft 71 journalled in a bearing formation 72, also provided on the partition wall 68. It will be noted that the gear 53 is smaller than the gears 54, 55, and 56 and that the gear 70 is larger than the gears 63, 64, and 65 so that this gear train provides a speed reduction between the engine and the drive shaft 71. This speed reducing gear train is only illustrative, however, and, in the case of a high speed turbine engine, other speed reducing transmission means may have to be used to obtain the proper rotational speed of the main drive shaft when driven by such an engine. The cylindrical housing 73 of the hub 40 has a diameter somewhat greater than the diameter of the cylindrical outer end portion of the engine compartment 46 and the inner end of the housing 73 overlaps the outer end of the engine housing and includes a rotational seal 74 provided between these overlapping housing ends to prevent water, mud, dust, or other foreign material from entering the engine compartment and the hub.

A fixed quill 75 is rigidly secured at one end to the partition wall 68 at the outer side of this wall and extends outwardly from the wall 68 to rotationally receive the main drive shaft 71. This quill is rigidly held against rotation and is used to absorb the reactive force of certain wheel turning gear trains to be later described. A transverse partition wall 76 is secured in the hub housing 73 adjacent to but spaced from the wall 68 and is provided with a central bearing formation 77 which journals the inner end of the hub on the fixed quill or core member 75. A second transverse partition member 78 is secured in the housing 73 in spaced and parallel relationship to the partition 76 and openings, as indicated at 80 in FIG. 4, are provided in the housing 73 between partitions 76 and 78 at equal angular intervals around the hub housing. The hollow spider arms 43 are secured at their inner ends to the housing 73 each in surrounding relationship to a corresponding opening 80 and project radially outwardly from the housing 73 at equal angular intervals, as has been previously described.

Figure 8:
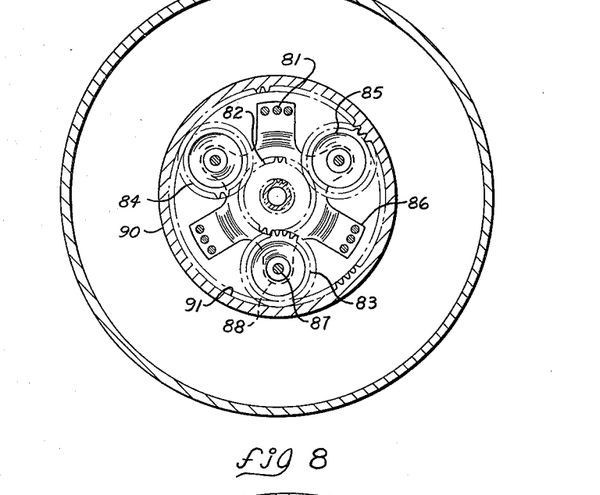
FIG. 8 is a transverse cross-sectional view substantially on a plane indicated by the line 8—8 on FIG. 4.
Figure 9:
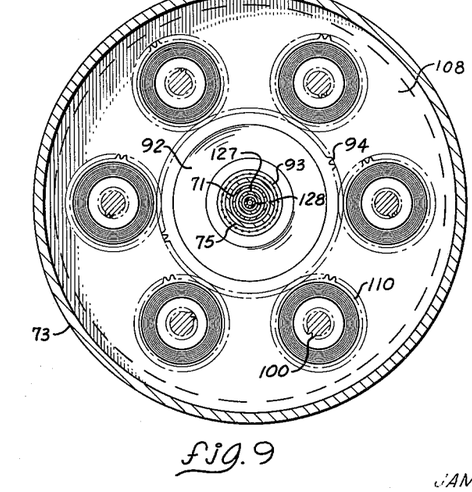
FIG. 9 is a transverse cross-sectional view substantially on a plane indicated by the line 9—9 on FIG. 4.

Near the outer end of the hub housing 73 the quill 75 is provided with an annular enlargement 81 formed of two separable parts, as shown in FIG. 4, and the main drive shaft 71 carries within this enlargement a drive gear 82 which meshes with spur gears 83, 84, and 85, as shown in FIG. 8, disposed at equal angular intervals around the gear 82. The gears 83, 84, and 85 are disposed in radial openings, as indicated at 86, in the core enlargement 81 and are journalled on corresponding axles, as indicated at 87, the ends of which are secured in tongues or tabs, as indicated at 88, projecting outwardly from the central portion of the member within the openings 86.

A compound gear 90 includes an internally toothed ring gear portion 91 surrounding and meshing with the gears 83, 84, and 85 and has one end open. At its other end, this gear is provided with an internal annular flange 92 journalled on the core member 75 by a bearing 93.

With this arrangement, when the main drive shaft 71 is driven by the engine through the speed reducing gear transmission previously described, the gear 90 will be driven at a further reduced speed through the gear train including the drive gear 82, the spur gears 83, 84, and 85 and the ring gear 91. The compound gear 90 also includes an externally toothed spur gear portion 94 surrounding the annular flange portion 92.

The mechanism by which the simple or planetary wheels 44 are driven will now be described. Assuming the arrangement of six planetary wheels, as illustrated in FIG. 1, the partition 76 is provided with six equally spaced boss formations 95a to 95f, inclusive, shown in FIG. 11, and each of these bosses slidably and rotatably receives a cylindrical end bearing member, as indicated at 96a to 96f, in FIG. 11. Each of these cylindrical bearing members carries on its end nearest the partition wall 68, a rounded boss, as indicated at 97 for the bearing member 95a, and carries at its opposite end an outwardly extending annular flange 98, the outer surface of which is provided with a clutch facing of frictional material for a purpose to be presently described.

A shaft, as indicated at 100 in FIG. 4, is slidably received at one end in the corresponding cylindrical bearing member 96, there being one shaft for each bearing member 96a to 96f inclusive and each shaft, while slidable relative to the corresponding bearing member, is rotationally locked thereto by a suitable spline formation, as indicated at 101 in FIG. 4.

A chain sprocket 102 is mounted on each shaft 100 adjacent to the flanged end of the corresponding bearing member 96 and each chain sprocket has, on its face adjacent to the flange 98 of the corresponding bearing member, a clutch facing of frictional material which cooperates with the clutch facing on the flange 98 to provide a driving connection between the corresponding bearing member 96 and the chain sprocket with which the bearing member is moved into engagement, the driving connection between each shaft 100 in the corresponding bearing member 96 having been previously described.

The partition member 78 is provided with angularly spaced apart bosses, as indicated at 104 in FIG. 4, and each of these bosses slidably receives a cylindrical clutch collar 105. Each shaft 100 is journalled in the corresponding clutch collar 105 by a suitable antifrictional bearing 106 and each clutch collar is drivingly connected at one end to the corresponding chain sprocket by a suitable spline connection 107. A transverse partition wall 108 is secured in the housing 73 spaced outwardly from the partition 78 and this wall 108 is provided with angularly spaced apart bearing bosses 109 in which the outer ends of the shaft 100 are journalled. A spur gear 110 is drivingly secured on each shaft 100 by a suitable spline connection and these spur gears all mesh with the spur gear portion 94 of the compound gear 90 so that the shafts 100 are all driven whenever the main drive shaft 71 is driven by the engine 45. The shafts 100 are, however, rotatable in the corresponding chain sprockets 102 so that the chain sprockets are not driven unless they are clutched to the corresponding shafts 100.

The clutch collar 105 is provided at its end remote from the corresponding chain sprocket 102 with spaced apart, outwardly extending annular flanges as indicated at 111 providing between them an annular groove for the reception of the outer edge portion of a clutch operating disk 112 which surrounds quill 75 between the partitions 78 and 108. The outer face, that is the face remote from the intermediate groove, of each of the flanges 111 may be provided with a clutch facing of frictional material. The portions of the partition wall 78 in alignment with the bosses 104 may be provided with clutch facings which cooperate with the clutch facing on the interior flanges 111 on the members 105 to lock these members and the corresponding chain sprocket against rotation when the operating disk 112 is moved toward the partition wall 78, and the gear 110 is provided with a clutch facing on its side adjacent the clutch collar 111 which cooperates with the clutch facing on the outer flange of the clutch collar to drive the clutch collar and the chain sprocket 102 when the clutch collar is moved away from the partition 78 to be clutched to the gear 110. Thus, all of the chain sprockets can be locked against rotation or all of the chain sprockets can be driven depending upon the position of the clutch collars 105 as controlled by the operating disk 112. The chain sprockets can also be made rotationally free on the corresponding shafts 100 without being either locked or driven by movement of the operating disk 112 to a neutral clutch position, as shown in FIG. 4.

Figure 10:
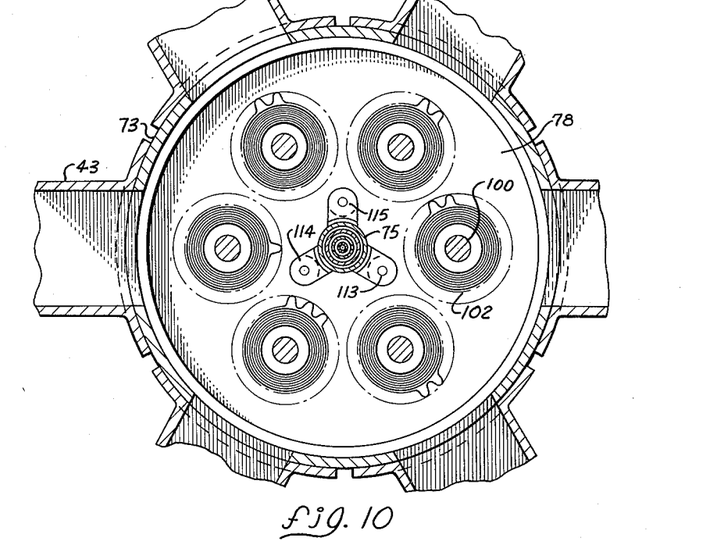
FIG. 10 is a cross-sectional view substantially on a plane indicated by the line 10—10 on FIG. 4.
Figure 11:
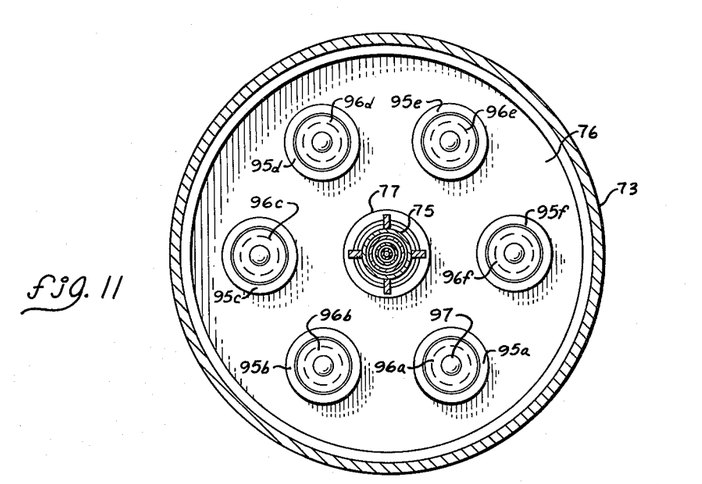
FIG. 11 is a transverse cross-sectional view substantially on a plane indicated by the line 11—11 on FIG. 4.

The operating disk 112 is moved by a hydraulic mechanism including cylinder and piston devices 113, 114, and 115, FIG. 10, mounted on the central core or quill 75 with the piston rods extending through openings in the partition wall 78 and connected to the inner portion of the disk 112.

Locking the chain sprockets 102 in the manner indicated above provides for the second mode of operation in which the planetary wheels are all locked against rotation and clutching of the chain sprockets to the corresponding drive gears 110 provides for the third mode of operation in which the planetary gears are all driven at the same time that the compound wheel itself is driven. For the first mode of operation, in which only the two bottom planetary wheels of each compound gear are driven, there is provided a control mechanism comprising a hydraulic piston and cylinder device 120 mounted in the lower portion of the fixed partition wall 68 and connected to an arcuately shaped pressure plate 121 which has a length sufficient to span the two cylindrical bearing and clutch elements 96 associated with the two bottom wheels of the compound wheel. When the hydraulic mechanism 120 is actuated, the plate 121 is forced toward the transverse partition wall 76 and engages the rounded bosses of the adjacent ends of the two members 96 forcing these members toward the corresponding chain sprockets 102. Movement of the bearing members 96 by the pressure plate 121 will first engage the clutch elements 98 on the two bottom members 96 and the two bottom chain sprockets 102 and will then force the chain sprockets toward the transverse partition wall 78 a distance sufficient to declutch the two bottom clutch collars 105 from the partition wall and free the chain sprockets to rotate. At this setting the vehicle can roll freely on the two lowermost wheels, such as when the vehicle is coasting or being towed. When hydraulic mechanism 120, 121 is actuated further the two bottom drive gears 110 are engaged with flanges 111 to drive sprockets 102, chains 155 and the two lowermost planetary wheels to thereby provide for the first or rolling mode of operation of the wheel.

In order to drive the central hub and the entire compound wheel, a cylindrical member 125 is disposed at the outer side of a transverse partition wall 126 located near the outer end of the hub housing 73 in concentric relationship to the main drive shaft 71. A pair of concentric hydraulic fluid conduits 127 and 128 extend entirely through the hollow drive shaft 71 and out of the end of this shaft nearest the engine 45. Both conduits also extend out of the outer end of the drive shaft and the inner conduit 128 extends through and is secured to the outer end wall 129 of the hollow cylindrical member 125 to hold this member in position relative to the outer side of the transverse partition wall 126. A hollow cylindrical piston 130 is slidably mounted in the cylinder 125 and surrounds the adjacent end portions of the main drive shaft 71.

Figure 14:
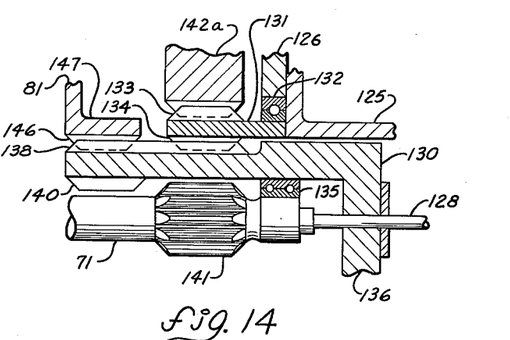
FIG. 14 is a fragmentary longitudinal cross-sectional view substntially on a plane indicated by the line 14—14 on FIG. 7.
Figure 15:
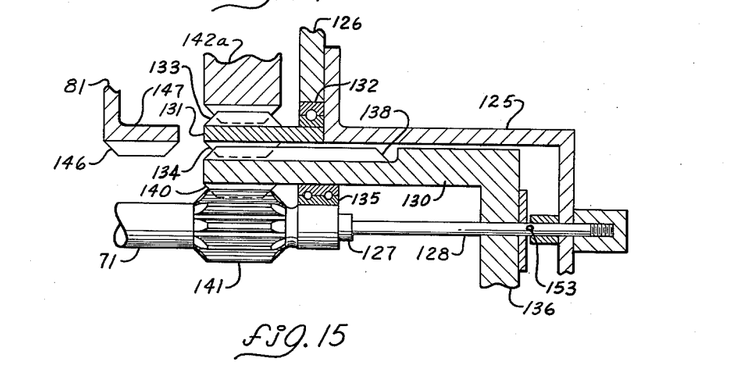
FIG. 15 is a fragmentary longitudinal cross-sectional view similar to FIG. 14, but showing the parts in a different operative position from that shown in FIG. 14.

As shown in FIG. 14 and FIG. 15, an annular gear member 131 is journalled in a central aperture in the partition wall 126 by an antifriction bearing 132 and is provided inwardly of the wall 120 with a series of external gear teeth 133 and a series of internal spline teeth 134.

The hollow piston 130 is journalled on the outer end of the main shaft 71 by means of an antifriction bearing formation 135 on the outer end of the drive shaft and bearing against the inner surface of the piston 130 and this hollow piston is provided with an end wall 136 at its other end. This end wall is provided with an aperture 153 through which the inner hydraulic fluid conduit 128 passes and a slidable seal is provided between the end wall and the hydraulic conduit to prevent leakage of hydraulic fluid through the aperture through which the conduit extends. The skirt portion of the hollow piston 130 is provided externally with a series of elongated spline teeth 138 and internally with a series of short spline teeth 140 the teeth 138 and 140 both extending substantially to the end of the skirt portion of the piston remote from the head wall 136. The main drive shaft 71 is provided within the piston 130 with a splined portion 141 with which the spline teeth 140 are engageable under certain conditions as will be later described.

Figure 7:
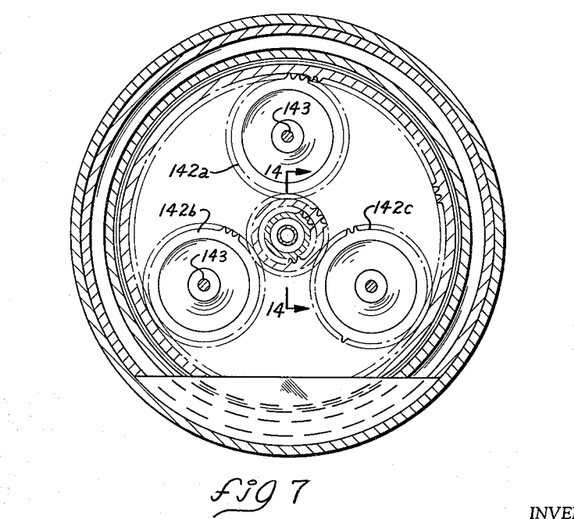
FIG. 7 is a transverse cross-sectional view substantially on a plane indicated by the line 7—7 on FIG. 4.

Referring now to FIG. 4, the external gear teeth 133 of the gear element 131 mesh with a set of planetary gears 142a, 142b and 142c, FIG. 7.

These gears are journalled on axles 143 carried by a planetary gear cage 144, which comprises a rear wall 144 having a central aperture receiving an extension of the central quill 75 beyond the quill enlargement 81 and having as its front wall the transverse partition wall 126. The angular shafts 143 are mounted at their opposite ends in the wall 144 and the partition wall 126, as shown in FIG. 4.

An internally toothed ring gear 145 is provided with a central aperture receiving the outward extension of the quill 75 and this ring gear is fixed to the quill so that it cannot rotate. The gears 142a, 142b, and 142c mesh with the internal teeth of the ring gear 145 and when these planetary gears are driven by the gear element 131 they rotate and also revolve around the interior of the ring gear causing the planet cage which includes the transverse partition wall 126 to rotate. Since the wall 126 is fixed to the housing 73 of the wheel hub this causes the hub and the entire wheel to rotate.

Referring now to FIGS. 14 and 15, when the hollow piston 130 is in the position shown in FIG. 14, the inner spline teeth 140 of this piston are out of engagement with the spline teeth 141 on the drive shaft 71 so that the piston 130 is not driven. At the same time, the portions of the outer spline teeth 138 adjacent the end of the piston skirt are engaged with internal spline teeth 146 provided in the extension 147 of the fixed quill 75 to positively hold the piston 130 against rotation. Since the spline teeth 138 are also engaged under these conditions with the internal spline teeth of the gear element 131, this gear element is held against rotation and in turn holds the planet gears against rotation. Since the planet gears are held against rotation and the ring gear 145 is fixed, the planet cage including the transverse partition wall 126 cannot move and the entire compound wheel is thus locked against rotation although some or all of the planetary wheels may rotate about their own individual axes as described above.

Thus the positioning of the piston as shown in FIG. 14 is consistent with the first mode of operation in which the compound wheel is held against rotation and the two bottom planetary wheels are rotated to provide the non-stepping or rolling mode of operation.

When it is desired to rotate the compound wheel, the piston 130 is moved from the position shown in FIG. 14 to that shown in FIG. 15. In this position of the piston 130 the internal spline teeth 140 in the piston are meshed with the splines 141 on the main drive shaft 71 and the outer splines 138 on the piston are drawn out of mesh with the internal splines 146 in the extension 147 of the quill enlargement 81 to free the hub of the compound wheel for rotation. The outer splines 138, however, remain in mesh with the internal splines 133 in the gear element 131 so that now as the piston 130 and the gear element 131 are rotated by the main drive shaft the gears 142a, 142b, and 142c will be driven and will orbit around the interior of the fixed ring gear 145 causing the partition wall 126 to rotate and rotate the hub 40.

Movement of the piston 130 between the positions shown in FIG. 14 and FIG. 15 is accomplished by hydraulic pressure supplied through the concentric conduits 127 and 128. Referring to FIG. 4, it will be noted that a fitting 150 is mounted on the end of the main drive shaft at the side of the gear 70 remote from the partition wall 68 and that two hydraulic lines 151 and 152 are connected to this fitting. The fitting is so constructed internally that hydraulic fluid from the line 151 is fed into the corresponding end of the outer hydraulic conduit 127 and hydraulic fluid from the line 152 is fed into the corresponding end of the inner hydraulic conduit 128. The outer hydraulic conduit 127 terminates within the hollow piston 130 so that when hydraulic fluid under pressure is supplied through this line to the interior of the cylinder and the inner conduit 128 is vented the piston 130 is moved outwardly toward the head wall of the outer cylinder 125, the piston 130 thus moving from the position shown in FIG. 14 to that shown in FIG 15. The inner hydraulic conduit 128 is provided with a fluid flow opening or aperture 153 just within the head wall of the cylinder 125. Now, when hydraulic fluid under pressure is supplied through the inner conduit 128 and the outer conduit 127 is vented, the fluid under pressure flowing through the aperture 153 will force the closed end of piston 130 away from the closed end of the cylinder 125 thereby moving the piston 130 from the position shown in FIG. 15 to that shown in FIG. 14. Selection between the first mode of operation and the second or third mode of operation is thus made by reversing the pressure and vent connections between the hydraulic lines 151 and 152 and selection between the second and third modes of operation is made by indicated operation of the hydraulic device 113.

Figure 5:
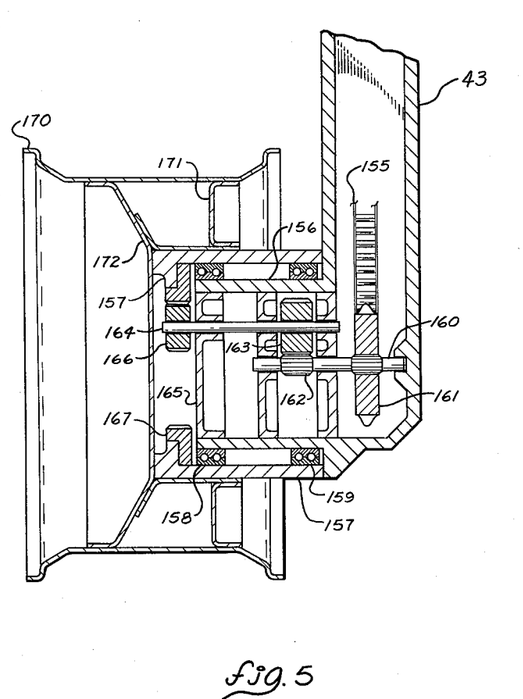
FIG. 5 is a fragmentary cross-sectional view on an enlarged scale substantially on a plane indicated by the line 5—5 on FIG. 1.

Drive chains, as indicated at 155 are trained one over each of the chain sprockets 102 and extend through the corresponding hollow spider arms 43. Referring now to FIG. 5, the spider arm has at its outer end an off-set cylindrical formation 156 which constitutes a bearing for the corresponding planetary wheel hub. The planetary wheel hub includes a cylindrical control member 157 which receives the cylindrical bearing formation 156 and is annularly spaced therefrom. Suitable antifriction bearings 158 and 159 are disposed in the annular space between the formation 156 and the member 157 and suitable means are provided to secure the member 157 on the bearing formation 156 against longitudinal displacement.

A shift 160 extends transversely through the outer end portion of the spider arm concentrically of the bearing formation 156 and is journalled in suitable bearings provided in the spider arm. This shaft carries within the stem portion of the spider arm a chain sprocket 161 over which the corresponding drive chain 155 is trained to drive the sprocket 161 and the shaft 160. Within the bearing formation 156, the shaft 160 carries a gear 162 which meshes with a group of circumferentially spaced apart gears, one of which is indicated at 163. The gear 163 is mounted on the shaft 164 which is journalled in the wall of the stem portion of the spider arm 43 and a partition wall 165 which closes the outer end of the bearing formation 156. A second gear 166 is mounted on the shaft 164 outwardly of the wall 165 and meshes with the teeth of an internal ring gear 167 secured in the central member 157 of the wheel hub. With this arrangement, when the chain sprocket 161 is driven by the chain 155 the hub member 157 is turned at a reduced speed.

The tire rim 170 is mounted on the central hub member 157 by suitable means such as the transverse walls or flanges 171 and 172 and carries the tire 174 of the planet wheel.

I claim:

1. A vehicle comprising an elongated body including a forward part and a rearward part interconnected by a coupling providing freedom of rolling and yawing movement of the two body parts relative to each other, manually controlled power actuated means interconnected between said body parts for causing controlled yawing movements of one part relative to the other for steering the vehicle, two wheels supporting each body part and disposed at respectively opposite sides thereof, power plant housings carried by each body part and providing bearings for the corresponding wheels, and a wheel driving power plant in each compartment, each of said wheels comprising a compound stepping wheel including a central hub structure and a plurality of simple wheels carried by and arranged around said central hub structure, and means for selectively driving the compound wheel or the simple wheels.

2. A vehicle comprising an elongated body including a forward part and a rearward part, a coupling interconnecting said parts for freedom of rolling and yawing movements of the parts relative to each other while holding the parts against relative pitching movements, manually controlled power actuated means operative between said parts to provide controlled relative yawing movements of said body parts, two wheels supporting each body part and disposed at respectively opposite sides of the corresponding part, power plant compartments carried by said body parts providing journal bearings for said wheels, and power plants mounted in said compartments and drivingly connected one to each of said wheels, each of said wheels comprising a compound wheel including a spider having a central hub and uniformly spaced apart arms radiating outwardly from said hub, a planetary wheel rotatably mounted on each arm at the outer end thereof, transmission means in said spider drivingly connecting the corresponding power plant to said spider and to said planetary wheels, and transmission control means effective to condition said transmission means to rotate the compound wheel while holding all of said planetary wheels against rotation and to hold said compound wheel against rotation while driving the planetary wheels at the bottom of the compound wheel.

3. A vehicle comprising an elongated hollow body including a forward part, a rearward part, a coupling interconnecting said parts and providing limited freedom of rolling and yawing movements of said parts relative to each other, and power plant compartments provided one at each opposite side of each body part, compound stepping wheels disposed one adjacent each power plant compartment and journalled relative thereto, and a power plant mounted in each of said compartments and drivingly connected to the corresponding wheel, each of said wheels comprising a spider having a central hollow hub and hollow arms radiating outwardly from said hub at equal angular intervals therearound, planetary wheels journalled one on each spider arm at the outer end thereof, transmission mechanism in said spider drivingly connecting the corresponding power plant to the spider and the planetary wheels, and manually operable control means effective to selectively condition said transmission mechanism for at least two modes of operation of said wheels in one of which the spider of the compound wheel is rotated and all of the planetary wheels are held against rotation and in the other of which the spider of the compound wheel is held against rotation and the two planetary wheels at the bottom of the compound wheel are rotated.

4. A vehicle comprising an elongated hollow body including a forward part, a rearward part of substantially the same size as said forward part, a coupling interconnecting said parts and providing limited freedom of rolling and yawing movements of said parts relative to each other, and power plant compartments provided one at each opposite side of each body part, compound stepping wheels provided one adjacent each power plant compartment and journalled relative thereto, and a power plant mounted in each power plant compartment and drivingly connected to the corresponding wheel, each of said compound wheels comprising a spider including a hollow central hub and hollow arms radiating outwardly from said hub at substantially equal angular intervals therearound, pneumatic tire planetary wheels journalled one on each spider arm at the outer end of the arm, and transmission mechanism in said spider drivingly connecting the corresponding power plant to said spider and said planetary wheels, and manually operated control means effective to selectively condition said transmission mechanism for at least three different modes of operation in the first of which the spider is rotated about its rotational axis and the planetary wheels are held against rotation about their rotational axes, in the second of which the spider is rotated about its rotational axis and all of the planetary wheels are rotated about their rotational axes and in the third of which the spider is held against rotation and the two bottom planetary wheels are rotated about their rotational axes.

5. In combination with a fixed hollow axle and a main drive shaft extending longitudinally through said axle, a wheel comprising a spider having a hollow central hub portion journalled on said axle and hollow arms extending radially from said hub portion at substantially equal angular intervals therearound, planetary pneumatic tire wheels journalled one on each hollow arm at the outer end of the arm, and transmission mechanism comprising a planetary gear train operative between said main drive shaft and the spider hub, clutch means selectively movable between two operative positions in one of which it connects said spider to said planetary gear train and in the other of which it disconnects said spider from said planetary gear train and connects said spider to said fixed axle, radially disposed drive means extending from the spider hub through said hollow arms to said planetary wheels, compound gear means effective to connect said main drive shaft to said radially disposed drive means, and clutch means having two operative conditions and a neutral condition in one of which operative conditions it drivingly connects said compound gear means to said radially disposed drive means and in the other of which it connects said radially disposed drive means to the spider hub, and in which neutral position it disconnects said radially disposed drive means from both said compound gear means and said spider hub leaving said planetary wheels free to rotate.

6. A vehicle wheel comprising a spider including a hollow hub and a plurality of hollow arms detachably secured to said hub and extending radially therefrom at substantially equal angular intervals therearound, a bearing formation at the outer end of each arm, pneumatic tire planetary wheels journalled one on each bearing formation, wheel driving means extending through each arm and into said hub, and transmission mechanism in said hub drivingly connectable with said wheel driving means to drive said planetary wheels.

7. A vehicle wheel comprising a spider including a hollow hub and a plurality of hollow arms detachably secured to said hub and extending radially therefrom at substantially equal angular intervals therearound, a bearing formation at the outer end of each arm, pneumatic tire planetary wheels journalled one on each bearing formation, wheel driving means extending through said hollow arms from the corresponding planetary wheels into said hub, transmission mechanism in said hub, and clutch means effective to selectively connect said transmission means to the planetary wheel driving means to drive selected planetary wheels.

8. A vehicle comprising an elongated body including a forward section and a rearward section and coupling means interconnecting said sections, and power plant compartments carried by each body section, and body supporting wheels journalled adjacent said power plant compartments and each including a spider having arms radiating from a central hub formation and planetary wheels journalled one on each spider arm at the outer end thereof, said body sections being constituted by separable units each of a size to be readily transported by commercial transportation means, said coupling being separable to release said two body sections from each other, said power plant compartments being removable from said body sections, said planetary wheels being removable from said spiders and the spider arms being demountable from the spider hubs whereby the entire vehicle can be reduced to separate components of a size convenient for transportation by commercial railway or ship.

References Cited by the Examiner

UNITED STATES PATENTS

| 1,326,679 | 12/19 | Macbeth et al. | 301—5 |
| 2,400,824 | 5/46 | Jackson | 180—8 |
| 2,931,449 | 4/60 | King | 180—8 |
| 3,057,319 | 10/62 | Wagner | 115—1 |

FOREIGN PATENTS 878,485   10/61   Great Britain.

BENJAMIN HERSH, *Primary Examiner.*

LEO FRIAGLIA, *Examiner.*